United States Patent
Guan et al.

(10) Patent No.: US 11,398,142 B2
(45) Date of Patent: Jul. 26, 2022

(54) SYSTEM AND METHOD FOR INDOOR ROUTE NAVIGATION

(71) Applicant: HERE GLOBAL B.V., Eindhoven (NL)

(72) Inventors: Yuxin Guan, Chicago, IL (US); Jingwei Xu, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/653,494

(22) Filed: Oct. 15, 2019

(65) Prior Publication Data
US 2021/0110683 A1  Apr. 15, 2021

(51) Int. Cl.
| | |
|---|---|
| G08B 7/06 | (2006.01) |
| H04W 4/33 | (2018.01) |
| H04W 4/90 | (2018.01) |
| G01C 21/20 | (2006.01) |
| G05D 1/02 | (2020.01) |
| H04W 84/18 | (2009.01) |
| H04W 4/40 | (2018.01) |
| G06Q 90/00 | (2006.01) |

(52) U.S. Cl.
CPC ........... *G08B 7/062* (2013.01); *G01C 21/206* (2013.01); *G05D 1/0214* (2013.01); *G06Q 90/205* (2013.01); *G08B 7/066* (2013.01); *H04W 4/33* (2018.02); *H04W 4/40* (2018.02); *H04W 4/90* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 7,579,945 B1 | 8/2009 | Richter et al. | |
| 8,174,931 B2 * | 5/2012 | Vartanian | G01S 19/49 367/128 |
| 9,681,280 B2 | 6/2017 | Balthasar et al. | |
| (Continued) | | | |

FOREIGN PATENT DOCUMENTS

| | | | | |
|---|---|---|---|---|
| EP | 2736027 A1 | 5/2014 | | |
| EP | 2736027 B1 * | 5/2018 | | G08B 7/066 |

OTHER PUBLICATIONS

Lujak et al., "A Distributed Architecture for Real-time Evacuation Guidance in Large Smart Buildings", Article published in Computer Science and Information Systems 14(1), Jan. 2017, pp. 257-282.
(Continued)

*Primary Examiner* — Muhammad Adnan
(74) *Attorney, Agent, or Firm* — Ditthavong, Steiner & Mlotkowski

(57) ABSTRACT

A method, a system, and a computer program product may be provided for generating indoor emergency route plan for an infrastructure. The method includes obtaining indoor map data of the infrastructure, where the indoor map data comprises one or more first exit routes to one or more exits in the infrastructure. The method further includes obtaining first location data associated with an indoor emergency event. The method further includes generating one or more second exit routes to the one or more exits, based on the first location data and the one or more first exit routes. The method further includes providing the one or more second exit routes to one or more subjects.

19 Claims, 10 Drawing Sheets

(56) References Cited

U.S. PATENT DOCUMENTS

| | | | |
|---|---|---|---|
| 9,683,856 B2 | 6/2017 | Iyer et al. | |
| 10,386,845 B1* | 8/2019 | Konrardy | G05D 1/0088 |
| 10,515,490 B2* | 12/2019 | Nordbruch | G07C 5/08 |
| 11,176,829 B2* | 11/2021 | Nemeth | G06Q 10/08 |
| 2008/0077326 A1* | 3/2008 | Funk | G08B 25/016 |
| | | | 701/500 |
| 2009/0043504 A1* | 2/2009 | Bandyopadhyay | G01C 17/38 |
| | | | 701/469 |
| 2009/0228201 A1* | 9/2009 | Liu | G01C 21/20 |
| | | | 701/533 |
| 2010/0057354 A1* | 3/2010 | Chen | G01C 21/206 |
| | | | 340/995.19 |
| 2010/0121567 A1* | 5/2010 | Mendelson | G06Q 30/0239 |
| | | | 342/463 |
| 2011/0081918 A1* | 4/2011 | Burdo | H04L 67/306 |
| | | | 455/456.1 |
| 2011/0090123 A1* | 4/2011 | Sridhara | H04W 4/021 |
| | | | 342/450 |
| 2011/0121963 A1* | 5/2011 | Prehofer | G01C 21/206 |
| | | | 340/539.13 |
| 2011/0161239 A1 | 6/2011 | Muehlmeier et al. | |
| 2015/0025791 A1* | 1/2015 | Huth | G01C 21/3667 |
| | | | 701/423 |
| 2015/0181678 A1* | 6/2015 | Sachs | H05B 47/105 |
| | | | 315/152 |
| 2017/0123432 A1* | 5/2017 | Yoon | B60W 50/14 |
| 2017/0176198 A1* | 6/2017 | Tatourian | G08G 1/096758 |
| 2017/0212511 A1* | 7/2017 | Paiva Ferreira | G08G 1/22 |
| 2017/0254654 A1* | 9/2017 | Nordbruch | G09B 29/007 |
| 2019/0234743 A1* | 8/2019 | Roy | G01C 21/206 |
| 2019/0271550 A1* | 9/2019 | Breed | F21S 41/13 |
| 2020/0208998 A1* | 7/2020 | Xiang | G01C 21/3415 |
| 2020/0209002 A1* | 7/2020 | Hou | G07C 5/008 |

OTHER PUBLICATIONS

Yulin et al., "A Dynamic Optimization Method of Indoor Fire Evacuation Route Based on Real-time Situation Awareness", Article, vol. 45, No. 12, Dec. 2016, English Abstract Included, pp. 1464-1475.

Wikipedia, "Indoor positioning system", retrieved on Oct. 15, 2019 from https://en.wikipedia.org/wiki/Indoor_positioning_system, pp. 1-13.

Office Action for related European Patent Application No. 20201831.3-1001 dated Mar. 1, 2021, 8 Pages.

* cited by examiner

SYSTEM AND METHOD FOR INDOOR ROUTE NAVIGATION

TECHNOLOGICAL FIELD

The present disclosure generally relates to systems and methods for generating an indoor emergency route plan, and more particularly relates to real-time optimization of the indoor emergency route plan to evacuate one or more subjects present inside an infrastructure during an emergency event.

BACKGROUND

Indoor navigation systems are employed to generate indoor navigation route plans for evacuating or traversing through infrastructures. An indoor navigation route plan comprises information about one or more exit routes of the infrastructure. The infrastructure may be enclosed structure such as an office building, hospital, railway station, airport, open air theatre, stadium, parking platform or the like. The indoor navigation route plan is used to navigate one or more subjects towards the one or more exit routes during one or more emergency events in the infrastructure. Usually, the one or more exit routes are predefined for the infrastructure and hence cannot be updated based on real-time environmental condition of the infrastructure. Due to this, the one or more exit routes may navigate the one or more subjects to a wrong exit route that may be affected by the emergency event.

Further, there are number of challenges associated with evacuation of the one or more subjects from the infrastructure using the indoor navigation system. Firstly, when the infrastructure is under the one or more emergency events, it is of high importance to timely and properly warn subjects living or working in the infrastructure. Further, to avoid potential threat to the lives of the one or more subjects, one or more correct routes routing to safety areas or exits, while avoiding areas under the emergency event, should be provided to the subjects. Secondly, it is difficult to do congestion analysis or estimation of congestion inside the one or more infrastructure. Lack of the congestion analysis may cause congestion at one or more exit routes, which may delay the evacuation process. The delay due to congestion may put lives of the one or more subjects in danger.

SUMMARY

Accordingly, there is a need to take into account real-time environmental information of the infrastructures under emergency event, in order to optimize the indoor navigation route plan. A system, a method, and a computer program product are provided in accordance with an example embodiment described herein for generating an indoor navigation routing plan for an infrastructure.

Embodiments disclosed herein may provide a system for generating an indoor emergency route plan for an infrastructure. The system may include a memory configured to store instructions, and one or more processors configured to execute the instructions to at least: obtain indoor map data of the infrastructure, where the indoor map data comprises one or more first exit routes to one or more exits in the infrastructure; obtain first location data associated with an indoor emergency event; generate one or more second exit routes to the one or more exits, based on the first location data and the one or more first exit routes; and provide the one or more second exit routes to one or more subjects. The one or more subjects may be inside the infrastructure. Further, the indoor map data may comprise a maximum traffic outflux capacity of each of the one or more first exit routes.

The one or more processors are further configured to: determine an emergency area associated with the indoor emergency event, based on the first location data; obtain second location data of each subject of the one or more subjects and real-time sensor data of the infrastructure, where the real-time sensor data indicates at least one of a first location data of the emergency area or a failure of one or more equipment inside the infrastructure; determine a presence of the one or more subjects is in the emergency area, based on the second location data of each subject of the one or more subjects and the first location data; and compute at least one closest exit route for at least one subject of the one or more subjects, based on the second location data of the at least one subject of the one or more subjects, the one or more second exit routes, and the real-time sensor data, where the at least one closest exit route bypasses the emergency area.

The one or more processors are further configured to obtain a real-time count of subjects on each exit route of the one or more second exit routes; and recompute the at least one closest exit route, based on the maximum traffic outflux capacity of each exit route of the one or more first exit routes and the real-time count of subjects on each exit route of the one or more second exit routes.

To recompute the at least one closest exit route, the one or more processors are configured to determine a maximum traffic outflux capacity of each exit route of the one or more second exit routes, based on the maximum traffic outflux capacity of each of the one or more first exit routes; and further determine whether the real-time count of subjects on at least one exit route of the one or more second exit routes exceeds the maximum traffic outflux capacity of a respective exit route of the one or more second exit routes.

The one or more subjects may be automated guided vehicles or users, and wherein to provide the one or more second exit routes to one or more subjects, the one or more processors are further configured to transmit navigation instructions to the one or more subjects. The one or more subjects comprise mapping service providers, and wherein the mapping service providers provide map data.

Further, the one or more processors are further configured to provide the one or more second exit routes via at least one of audio data or video data corresponding to the one or more second exit routes.

In an embodiment, the one or more processors are further configured to provide the one or more second exit routes to the one or more automated guided vehicles, using Vehicular Ad-hoc Network (VANET).

In another embodiment, the one or more processors are further configured to recompute the at least one closest exit route based on one of a shortest time, a shortest route or minimization of cost functions that take into account the real-time sensor data in emergency events.

The one or more processors are further configured to update the indoor map data of the infrastructure, based on the first location data and the one or more first exit routes, and where the updated indoor map data further comprises the real-time sensor data. Further, the real-time sensor data comprises at least one or more of stairway closures, elevator closures, emergency area location, and Radio-Frequency (RF) beacon point di sable function.

According to another embodiments disclosed herein may provide a method for generating an indoor emergency route plan for an infrastructure. The method comprising: obtaining indoor map data of the infrastructure, where the indoor map data comprises one or more first exit routes to one or more exits in the infrastructure; obtaining first location data associated with an indoor emergency event; generating one or more second exit routes to the one or more exits, avoiding the emergency event area being updated real time in indoor map, based on the first location data and the one or more first exit routes; and providing the one or more second exit routes to one or more subjects.

According to another embodiments disclosed herein may provide a non-transitory computer readable medium having stored thereon, computer-executable instructions for causing a computer to execute operations for generating an indoor emergency route plan for an infrastructure, the operations comprising: obtaining indoor map data of the infrastructure, where the indoor map data comprises one or more first exit routes to one or more exits in the infrastructure, obtaining first location data associated with an indoor emergency event; generating one or more second exit routes to the one or more exits, avoiding the emergency event area being updated real time in indoor map, based on the first location data and the one or more first exit routes; and providing the one or more second exit routes to one or more subjects.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
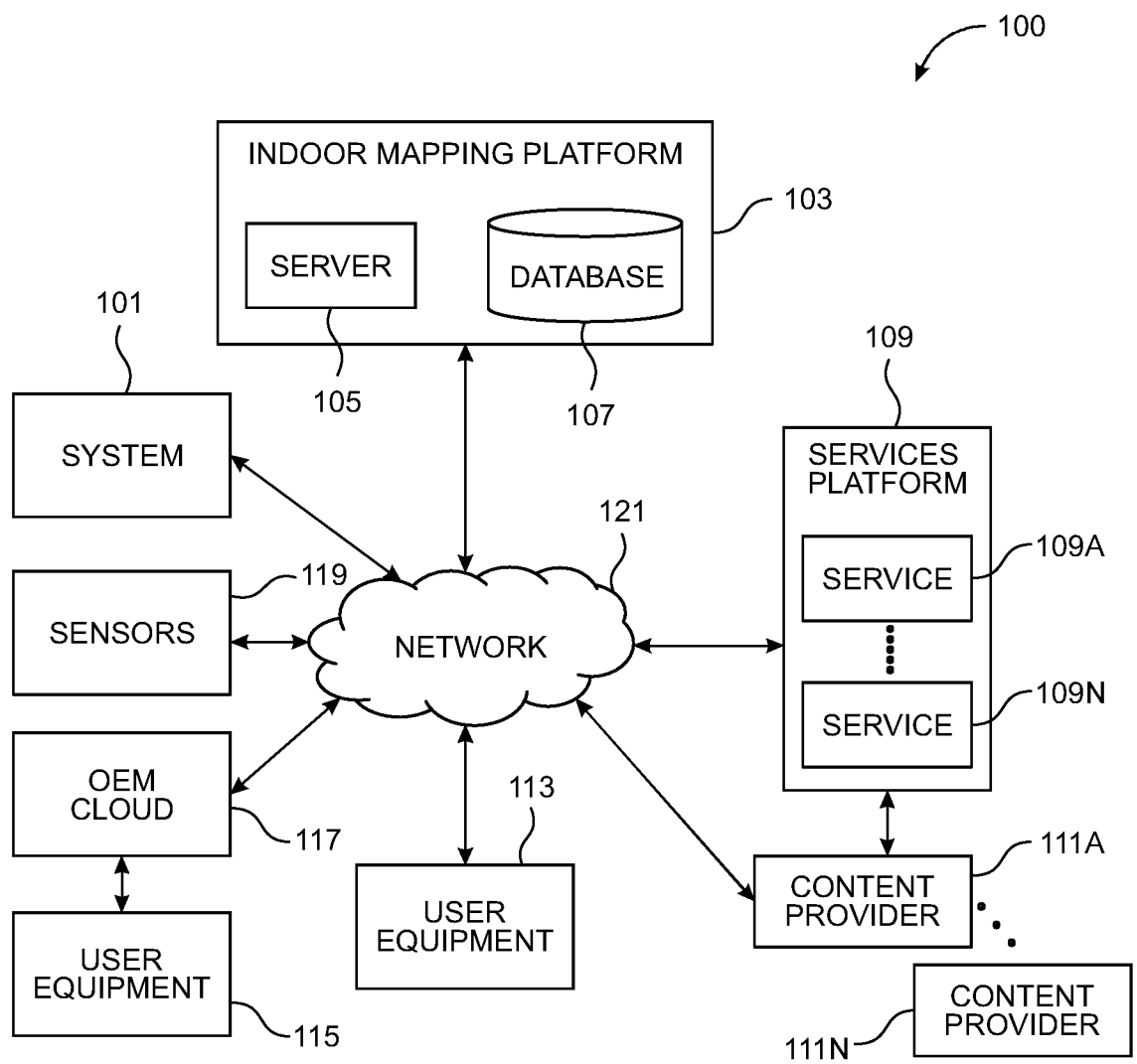
Figure 2:
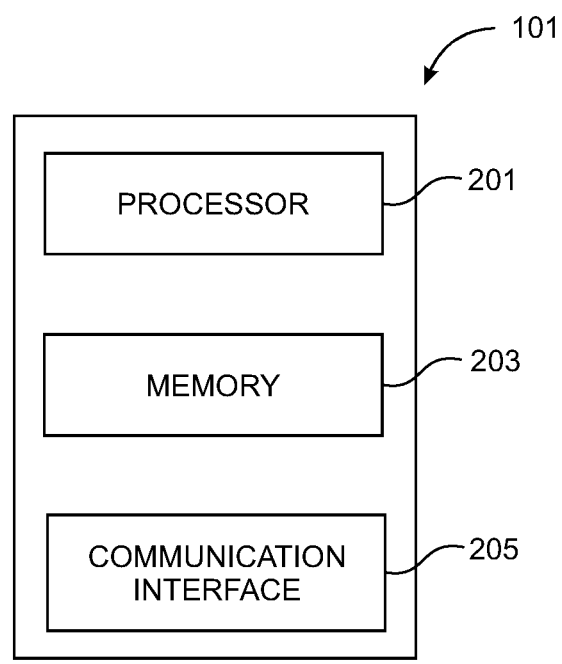
Figure 3:
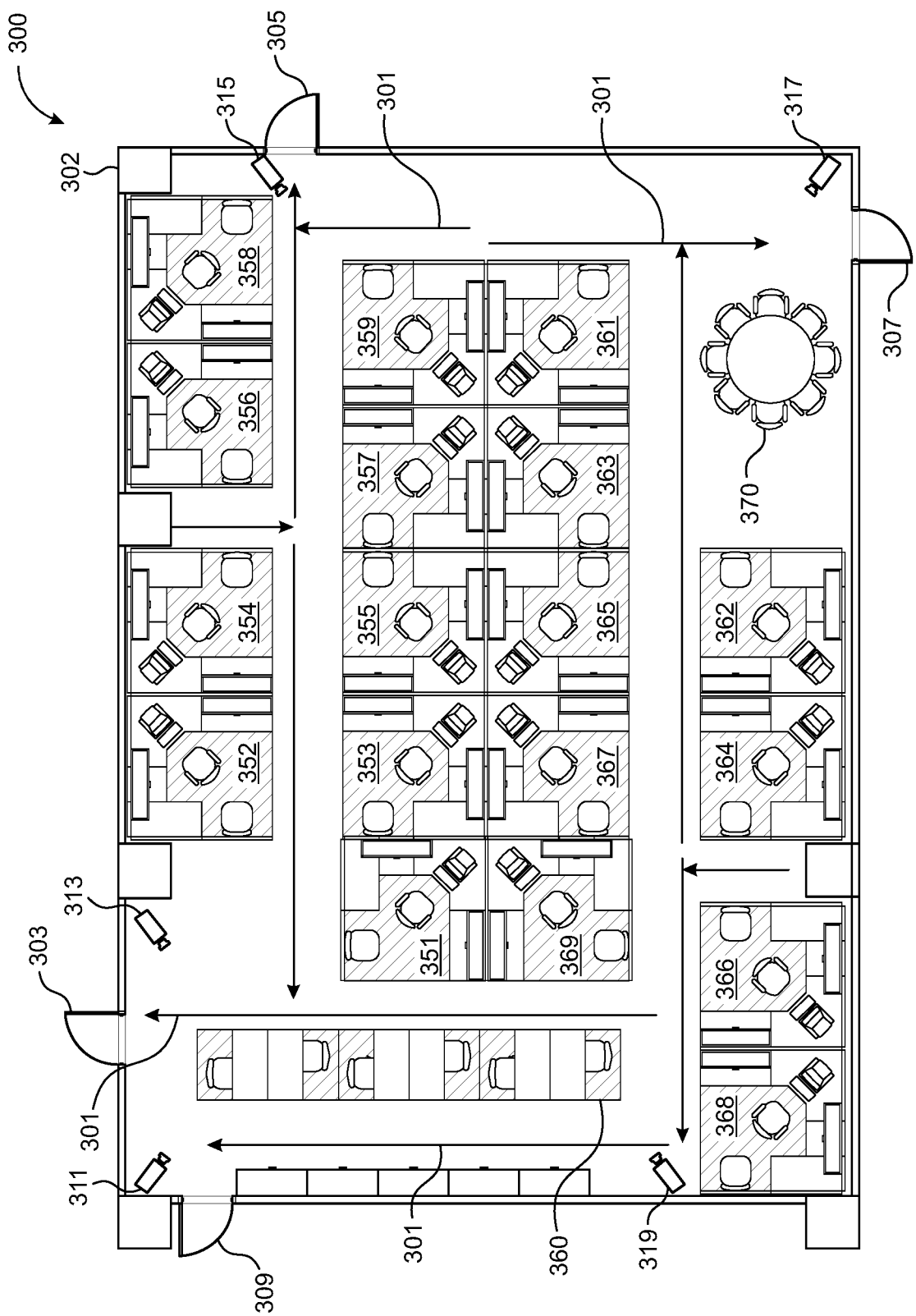
Figure 4A:
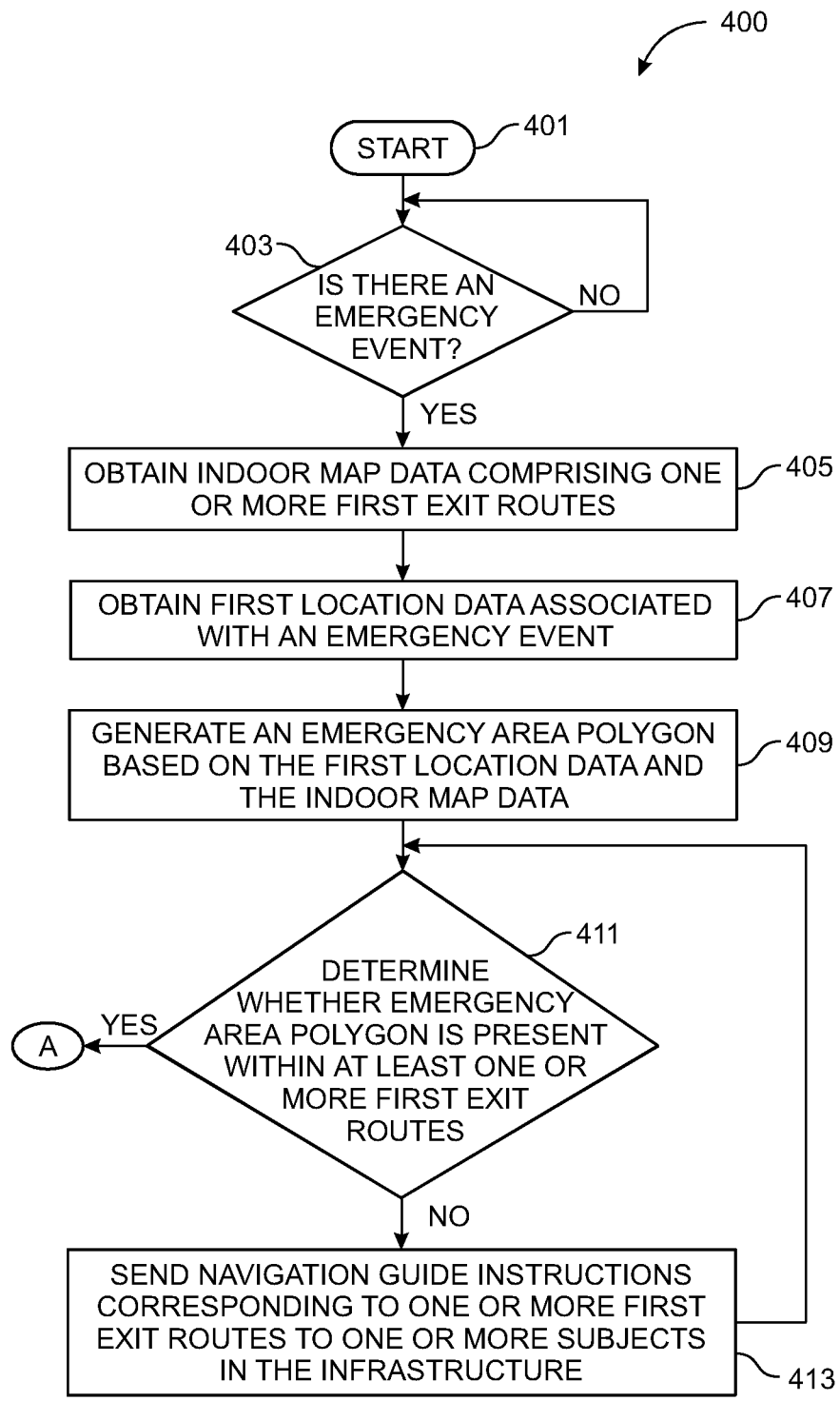
Figure 4B:
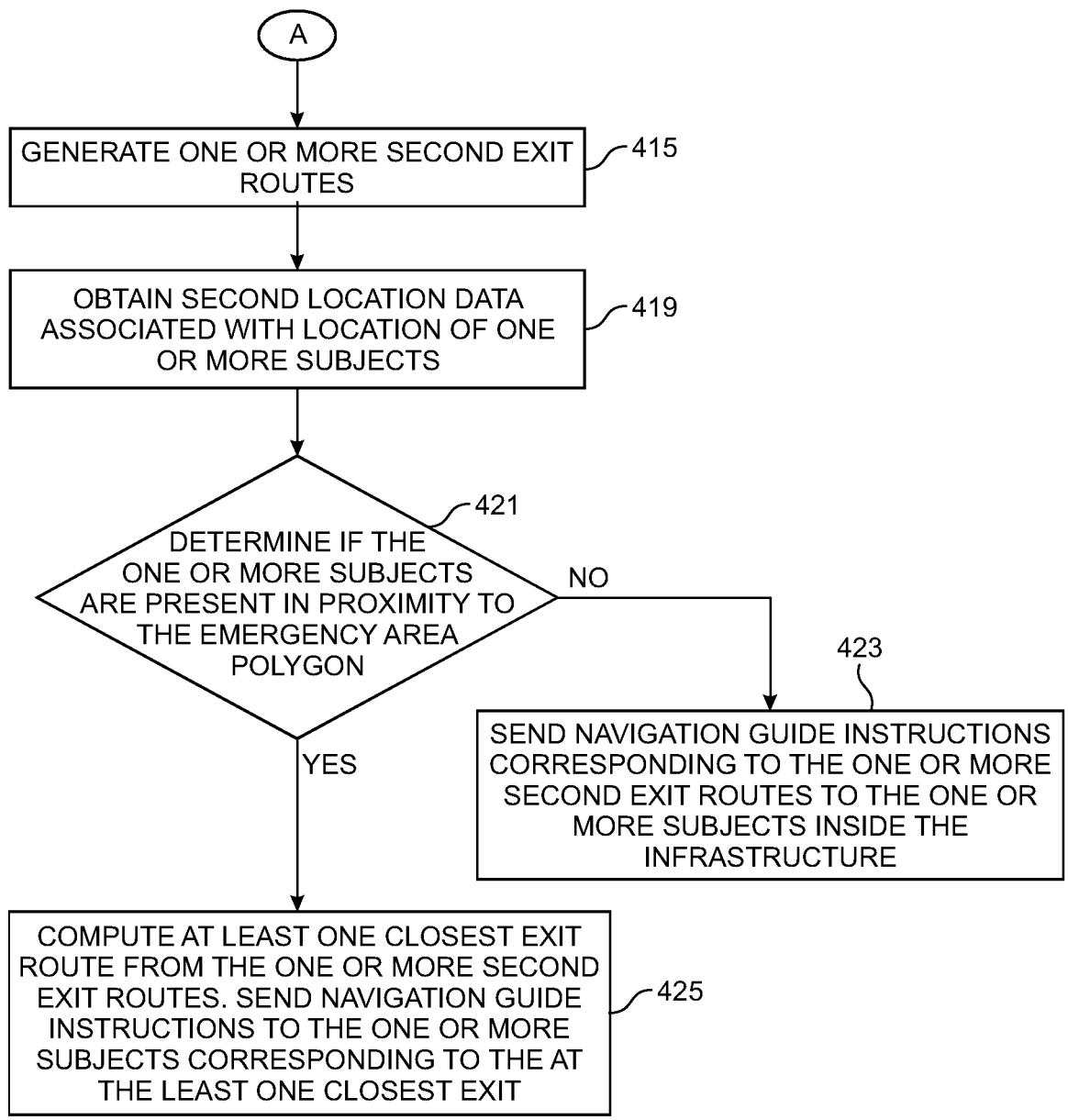
Figure 5:
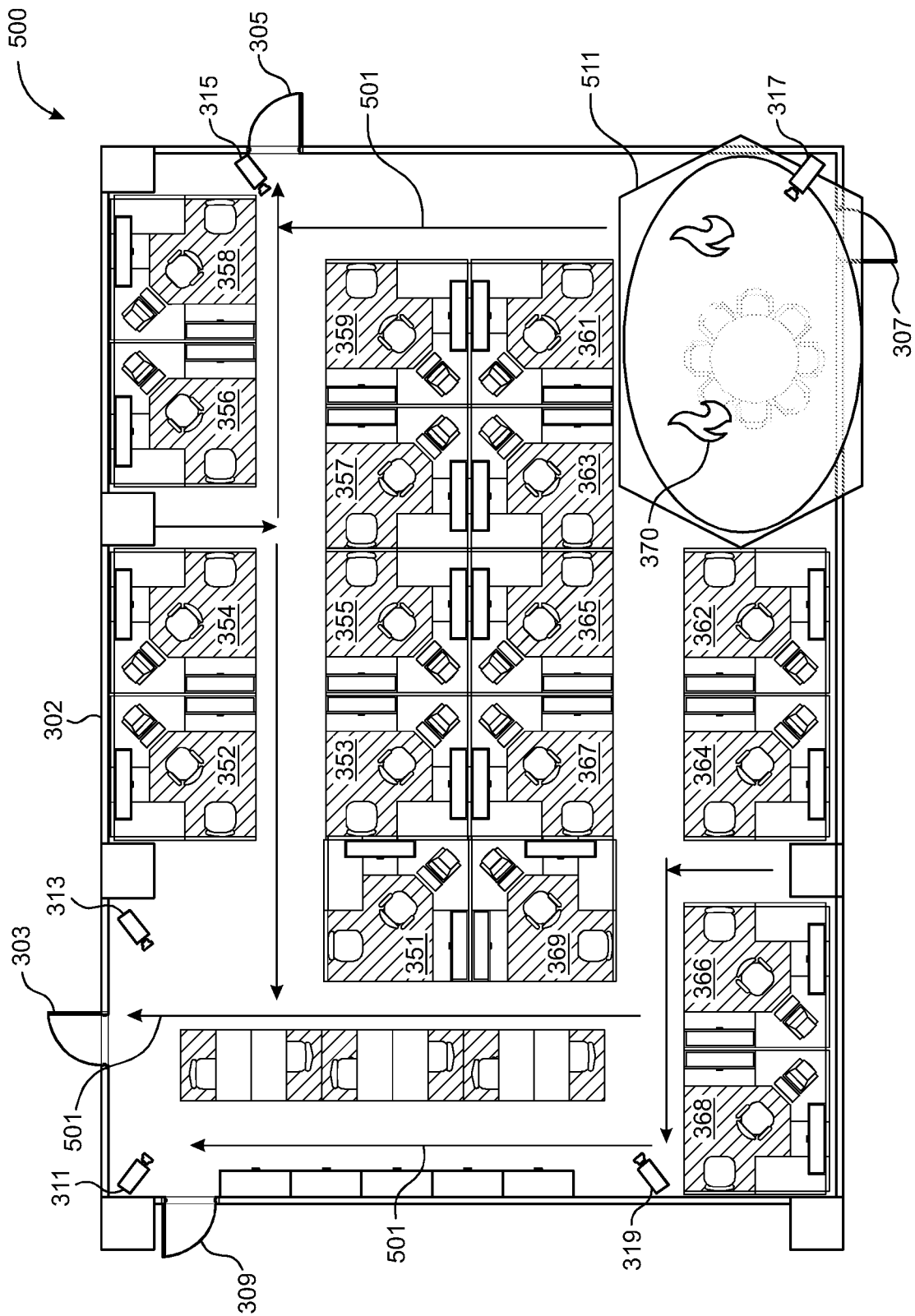
Figure 6:
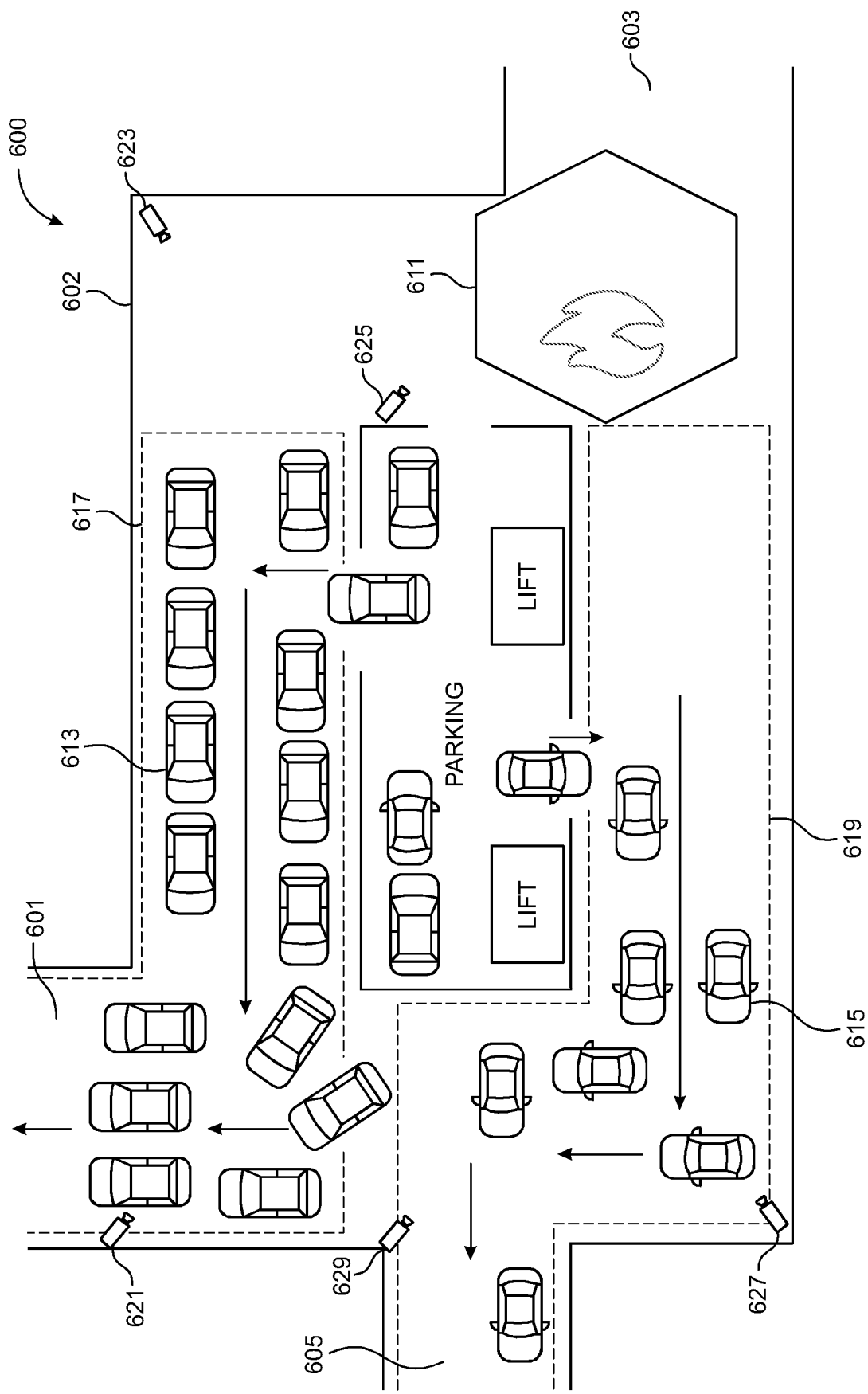
Figure 7:
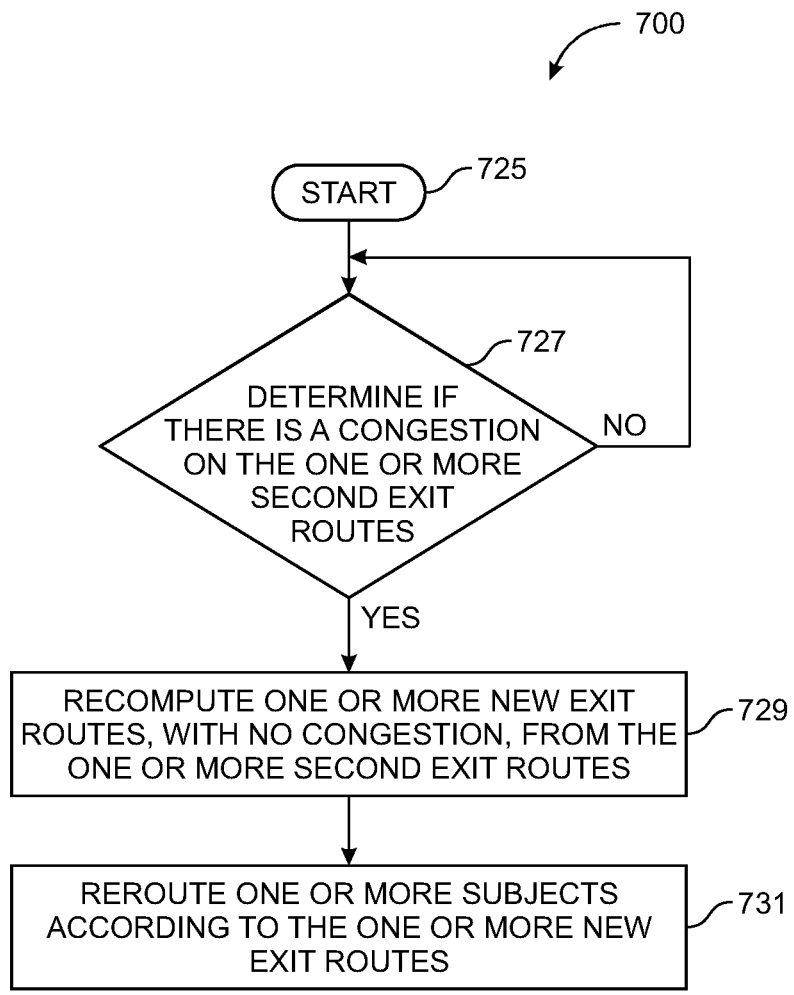
Figure 8:
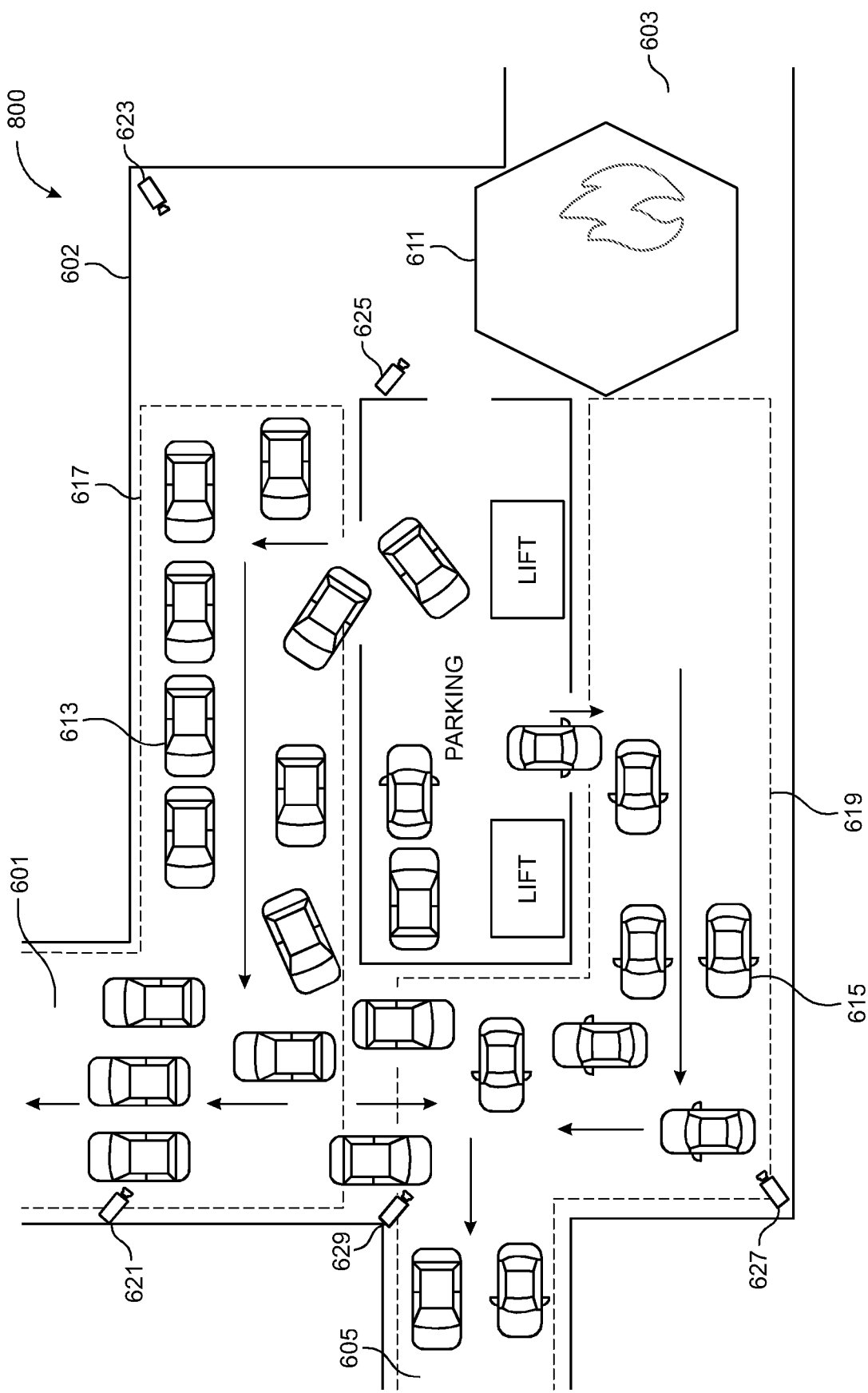
Figure 9:
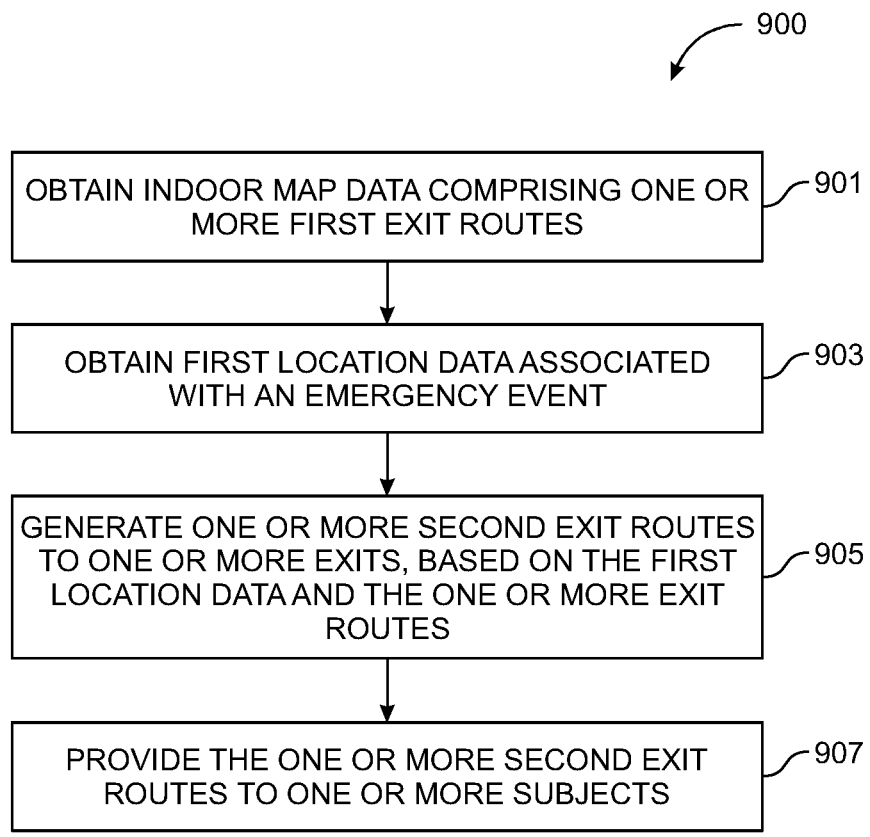

Having thus described example embodiments of the invention in general terms, reference will now be made to the accompanying drawings, which are not necessarily drawn to scale, and wherein:

FIG. 1 illustrates a block diagram of a network environment of a system for generating an indoor emergency route plan for evacuation from an infrastructure, in accordance with an example embodiment;

FIG. 2 illustrates a block diagram of the system, exemplarily illustrated in FIG. 1, for generating an indoor emergency route plan for evacuation from an infrastructure, in accordance with an example embodiment;

FIG. 3 illustrates an example representation of indoor map data of an infrastructure, in accordance with an example embodiment of the present disclosure;

FIGS. 4A and 4B collectively illustrate a flowchart for implementation of an exemplary method for generating an indoor navigation route and evacuation plan, in accordance with an example embodiment;

FIG. 5 illustrates an exemplarily implementation of the present invention, in accordance with an example embodiment;

FIG. 6 illustrates an exemplarily environment depicting congestion at one or more exit routes during an evacuation process, in accordance with an example embodiment of the present disclosure;

FIG. 7 exemplarily illustrates a flowchart for implementation of an exemplary method for controlling congestion occurred during emergency evacuation, in accordance with an example embodiment;

FIG. 8 illustrates an exemplarily environment depicting another practical implementation of the present invention to control congestion, in accordance with an example embodiment; and FIG. 9 exemplarily illustrates a flowchart for implementation of an exemplary method for generating indoor emergency route plan for evacuation from an infrastructure, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "exit route" may be used to refer to a path from any location within an infrastructure to one or more exit points, emergency exits or the like.

The term "link" may be used to refer to any connecting pathway including but not limited to a lane, a road, an aisle, an alley or the like.

The term "autonomous guided vehicle" may be used to refer to any vehicle having autonomous driving capabilities at least in some conditions. An autonomous guided vehicle, as used throughout this disclosure, may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

End of Definitions

A method, a system, and a computer program product may be provided for generating an indoor emergency route plan for evacuation from an infrastructure. Embodiments of the present disclosure may provide a system for generating a dynamically updated indoor navigation routing plan for evacuation from the infrastructure. The system obtains indoor map data associated with the infrastructure. Further, the system obtains location data associated with respective locations of one or more emergency areas within the infrastructure. Based on the indoor map data and the location data, the system generates one or more exit routes that bypass the one or more emergency areas. Further, the system provides navigation guide instructions, corresponding to the one or more exit routes, to one or more subjects inside the infrastructure. Furthermore, the system determines presence of congestion on the one or more exit routes and reroutes the one or more subjects to one or more new closest exit routes to avoid the problem of congestion. These and other technical improvements of the invention will become evident from the description provided herein.

FIG. 1 illustrates a block diagram of a network environment 100 of a system for generating an indoor emergency route plan for evacuation from an infrastructure, in accordance with an example embodiment. According to an example embodiment, the infrastructure may be an enclosed building such as office building, hospital, railway station, bus station, airport, open air theatre, stadium, parking station, ship, submarine, thermal/hydel/nuclear power plant, solar plant, windmill, factory or the like. The system 101 may be communicatively with one or more of an indoor mapping platform 103, a services platform 109, a plurality of content providers 111A . . . 111N, user equipment (UE) 113, an OEM cloud 117 that is coupled with a user equipment 115, one or more sensors 119 via a network 121. The indoor mapping platform 103 may include a server 105 and a database 107. Further, the server 105 and the database 107 may be communicatively coupled to each other. The services platform 109 may comprise a plurality of services 109A . . . 109N. The mapping platform 103 may be communicatively coupled to the services platform 109 and the plurality of content providers 111A . . . 111N, via the network 121. Further, the services platform 109 and the plurality of content providers 111A . . . 111N may be communicatively coupled to each other. In some example embodiments, a user equipment such as the user equipment 113 may be communicatively coupled to the indoor mapping platform 103, directly via the network 121. Additionally or optionally, the indoor mapping platform 103 may be coupled to the user equipment 115 via the original equipment manufacturer (OEM) cloud 117 and the network 121.

The system 101 may be embodied in one or more of several ways as per the required implementation. For example, the system 101 may be embodied as a cloud based service or a cloud based platform. As such, the system 101 may be configured to operate outside the user equipment 113 and/or 115 and/or the indoor mapping platform 103. However, in some example embodiments, the system 101 may be embodied within the user equipment 113, 115 or the indoor mapping platform 103, for example as part of an in-vehicle navigation system or as a navigation service provider, as the case may be.

Additionally or alternately, in some example embodiments, user equipment such as the user equipment 115 may be communicatively connected to the OEM cloud 117 which in turn may be accessible to the indoor mapping platform 103 via the network 121. All the components in the network environment 100 may be coupled directly or indirectly to the network 121. Further, the one or more sensors 119 may be communicatively coupled to the system 101 via the network 121. The components described in the network environment 100 may be further broken down into more than one component and/or combined together in any suitable arrangement. Further, one or more components may be rearranged, changed, added, and/or removed. Furthermore, fewer or additional components may be in communication with the system 101 within the scope of this disclosure.

In each of such embodiments, the system 101 may be communicatively coupled to the components shown in FIG. 1 to carry out the desired operations and wherever required modifications may be possible within the scope of the present disclosure.

The indoor mapping platform 103 may comprise suitable logic, circuitry, interfaces, and code that may be configured to generate the indoor emergency route plan for an infrastructure. The server 105 of the indoor mapping platform 103 may comprise processing means and communication means. For example, the processing means may comprise one or more processors configured to process requests received from the system 101 and/or the user equipment 113, 115. The processing means may fetch map data from the database 107 and transmit the same to the system 101 and/or to the user equipment 113, 115 in a suitable format. In one or more example embodiments, the indoor mapping platform 103 may periodically communicate with the user equipment 113, 115 via the processing means to update a local cache of the indoor map data stored on the user equipment 113, 115. Accordingly, in some example embodiments, the indoor map data may also be stored on the user equipment 113, 115 and may be updated based on periodic communication with the indoor mapping platform 103.

The indoor mapping platform 103 may comprise the database 107 for storing the indoor map data of one or more infrastructures such as hospitals, stadiums, airports, industrial plants or any other enclosed buildings. The database 107 may store point cloud data collected from the user equipment 113 and/or 115. The database 107 may store node data, point of interest (POI) data, internal road link data or the like. The node data may be end points corresponding to the respective links or segments of internal roads. The internal road link data and the node data may represent a network of routes, such as used by pedestrians, cyclists, vehicles such as cars, trucks, buses, motorcycles, and/or other entities. The database 107 may also store indoor map data of the one or more infrastructure. In an example embodiment, the indoor map data may comprise a floor plan of each floor of the infrastructure showing respective position and dimension of rooms, doors, emergency exits, normal exits, lifts, machines or other equipment present in the respective floor of the infrastructure The indoor map data may be a two-dimensional or three-dimensional data representing objects and location of the objects inside the infrastructure. The objects inside the infrastructure represented by the indoor map data may be doors, tables, chairs, elevators, escalators, stairways or the like. The database 107 may be communicatively coupled with the one or more sensors 119 to obtain the indoor map data from one or more sensors 119 via network 121. Further, the database 107 may also obtain the indoor map data from one or more authorities of the infrastructure. In some example embodiments, the authorities of the infrastructure may be building planners, owner or governor of the infrastructure such as building owners, government departments managing such infrastructures and the like. The database 107 may further store maximum outflux capacity of one or more exit routes of the one or more infrastructures.

The database 107 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled to form database products or databases, which may be used in end user navigation devices or systems.

For example, the data may be compiled (such as into a platform specification format (PSF)) to organize and/or configure the data for performing emergency route navigation-related functions and/or services, such as emergency exit route calculation, emergency exit route guidance, map display, speed calculation, distance and travel time functions, and other functions, by a navigation device, such as by the user equipment 113, 115. The navigation-related functions may correspond to vehicle navigation, navigation of individuals, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In alternate embodiments, the database 107 may be embodied as a client-side map database and may represent a compiled navigation database that may be used in or with end user devices to provide navigation and/or map-related functions. In such a case, the database 107 may be downloaded or stored on the user equipment 113, 115. The services platform 109 may provide emergency route navigation related functions and the plurality of services 109A . . . 109N to the user equipment 113, 115. The plurality of services 109A . . . 109N may include navigation functions, speed adjustment functions, internal or external traffic related updates, warnings and alerts, parking related services, and indoor mapping services. In accordance with an embodiment, the plurality of services 109A . . . 109N may be provided by the plurality of content providers 111A . . . 111N. In some examples, the plurality of content providers 111A . . . 111N may access various Software Development Kits (SDKs) from the services platform 109 for implementation of the plurality of services 109A . . . 109N. In accordance with an embodiment, the services platform 109 and the indoor mapping platform 103 may be integrated into a single platform to provide a suite of mapping and navigation related applications for OEM devices, such as the user equipment 115. The user equipment 113, 115 may be configured to interface with the services platform 109, the plurality of content provider 111A . . . 111N, and the indoor mapping platform 103 over the network 121. Thus, the indoor mapping platform 103 and the services platform 109 may enable provision of cloud-based services for the user equipment 113, 115, such as, storing the sensor data in the OEM cloud 117 in batches or in real-time and retrieving the stored sensor data for determining boundary data of the top surface of each of the one or more objects.

The plurality of content providers 111A . . . 111N may be configured to maintain data stored in the database 107. The plurality of content provider 111A . . . 111N such as an indoor map developer may maintain the indoor mapping platform 103. By way of example, the indoor map developer may collect data associated with location of objects, one or more exit routes and the like to generate and enhance the indoor mapping platform 103. There may be different ways used by the indoor map developer to collect data. In addition, the indoor map developer may employ field personnel and/or automated guided vehicles to travel inside the one or more infrastructure to observe features, for example objects, exit routes and the like. The personnel and/or the automated guided vehicle may record information about the one or more infrastructure. The database 107 may also generate, substantiate, or update the indoor map data using crowdsourcing of indoor map data. The crowdsourcing may be based on gathering data using one or more user equipment 113, 115. For example, sensor data from a plurality of data probes, which may be, for example, the one or more subjects within the infrastructure, vehicles traveling within the infrastructure, one or more sensors employed within the infrastructure, may be gathered and fused to infer an accurate indoor map of an environment in which the data probes are moving. Such sensor data may be updated in real time such as on an hourly basis, to provide accurate and up to date map data. The sensor data may be from any sensor that may inform the database 107 of features within an environment that are appropriate for mapping. For example, motion sensors, inertia sensors, image capture sensors, proximity sensors, LiDAR (light detection and ranging) sensors, ultrasonic sensors or the like. The gathering of large quantities of crowd-sourced data may facilitate the accurate modeling and mapping of an environment inside the infrastructure. Also, remote sensing, such as aerial or satellite photography, may be used to generate map geometries directly or through machine learning.

The user equipment 113, 115 may be any user accessible device such as a mobile phone, a smartphone, a portable computer, and the like that is portable in itself or as a part of another portable/mobile object such as a vehicle. The user equipment 113, 115 may comprise a processor, a memory and a communication interface. The processor, the memory and the communication interface may be communicatively coupled to each other. In some example embodiments, the user equipment 113, 115 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. As such, the user equipment 113, 115 may be autonomous vehicles, semi-autonomous vehicle or a manually driven vehicle. In such example embodiments, the user equipment 113, 115 may comprise processing means such as a central processing unit (CPU), storage means such as on-board read only memory (ROM) and random access memory (RAM), acoustic sensors such as a microphone array, position sensors such as a GPS sensor, gyroscope, a LiDAR sensor, a proximity sensor, motion sensors such as accelerometer, a display enabled user interface such as a touch screen display, and other components as may be required for specific functionalities of the user equipment 113, 115. Additional, different, or fewer components may be provided. For example, the user equipment 113, 115 may be configured to execute and run mobile applications such as a messaging application, a browser application, a navigation application, and the like. In an example embodiment, the user equipment 113 may be an electronic device held by the one or more subjects, for example, a mobile phone, a smart watch, a smart camera or the like. In another example embodiment, the user equipment 115 may be a vehicle associated with the one or more subjects, for example an autonomous vehicle, a semi-autonomous vehicle, or a manually-driven vehicle. The user equipment 113, 115 may be directly coupled to the system 101 via the network 121. In some example embodiments, one or more of the user equipment 113, 115 may serve the dual purpose of a data gatherer and a beneficiary device. The user equipment 113, 115 may be configured to capture sensor data associated with an infrastructure which the user equipment 113, 115 may be traversing. The sensor data may for example be image data of at least one of an object inside the infrastructure, a signage inside the infrastructure, or the like.

The sensor data may refer to data collected from one or more sensors 119 present within the infrastructure. The one or more sensors 119 may correspond to sensors embedded in the user equipment 113, 115, sensors embedded in machines employed within the infrastructure, embedded sensors network present in the infrastructure, standalone sensor unit placed within the infrastructure, or the like. The one or more sensors 119 are configured to capture real-time information related to an environmental condition of premises of the infrastructure, and further provide the captured real-time information to the system 101 either continuously or in a periodic manner. The one or more sensors 119 may be configured to detect one or more emergency events at the infrastructure. The emergency events may be fire, flood, earthquake, accidental door lock, chemical leakage, nuclear radiation leakage, electric short circuits, equipment malfunction or the like. In a non-limiting example, the infrastructure may be mounted with one or more of heat detectors, smoke detectors, flame detectors, fire and gas detectors, electric equipment malfunction detection sensors, radiation sensors, chemical leak detection sensors, temperature sensors or the like, to detect outbreak of an emergency situation within the infrastructure. In some example embodiments the infrastructure may be mounted with earthquake detectors to detect earthquakes. In an example embodiment, the one or more sensors 119 may comprise microphones to provide real-time audio data of the premises of the infrastructure to the system 101, or the one or more sensors 119 may comprise imaging devices to provide real-time video data of the premises of the infrastructure to the system 101. The one or more sensors 119 may further comprise door sensors that may provide real-time status of respective doors of the infrastructure (for example, the door being open, partially open, closed or locked) to the system 101. The system 101 may communicate with the one or more sensors 119 to open or close at least one door of the one or more doors based on the status of the one or more doors obtained by the one or more sensors 119. Further, the system 101 is configured to communicate with the one or more sensors 119 that may be present inside the user equipment 113 or 115 of the one or more subjects inside the infrastructure. The one or more sensors 119 of the user equipment 113 may be gyroscopic sensors or accelerometer that may provide to the system 101 orientation of the user equipment 113 and angular velocity of the user equipment 113.

The sensor data from the one or more sensors 119 may indicate failure of one or more electronic equipment associated with the infrastructure, at least one or more of stairway closures, elevator closures, emergency area location, and Radio-Frequency (RF) beacon point disable function or the like, which provides real-time environmental conditions inside the infrastructure. Further, the system 101 may use the sensor data provided by the one or more sensors 119 to determine location of an emergency area, location of the one or more subjects in the infrastructure, congestion of subjects on the one or more exit routes, and one or more new exit routes that bypass the emergency area.

The network 121 may comprise suitable logic, circuitry, and interfaces that may be configured to provide a plurality of network ports and a plurality of communication channels for transmission and reception of data, such as the sensor data, map data from the database 107 or the like. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 119 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 121 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

FIG. 2 illustrates a block diagram of the system 101, exemplarily illustrated in FIG. 1, for generating an indoor emergency route plan for evacuation from an infrastructure, in accordance with an example embodiment. FIG. 2 is described in conjunction with elements from FIG. 1. The system 101 may include one or more processors, such as a processor 201, a memory 203, and a communication interface 205.

The processor 201 may comprise suitable logic, circuitry, and interfaces that may be configured to execute instructions stored in the memory 203. The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. The processor 201 may be configured to obtain the indoor map data associated with an infrastructure from the indoor mapping platform 103. The processor 201 may further obtain location data associated with an emergency area affected by an emergency event inside the infrastructure. The processor 201 may be further configured to obtain one or more first exit routes associated with the infrastructure from the received input map data. The one or more first exit routes comprise possible routes to different exits of the infrastructure from any location within the infrastructure. Further, the processor 201 may be configured to analyze the one or more exit routes and determines whether the emergency area is falling in any exit route of the one or more exit routes. Upon determination that the emergency area is falling in one exit route of the one or more first exit routes, the processor 201 performs rerouting and generate one or more second exit routes which includes the exit routes bypassing the emergency area. Further, the processor 201 may provide the one or more second exit routes to one or more subjects inside the infrastructure.

Examples of the processor 201 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 201 may implement a number of processor technologies known in the art such as a machine learning model, a deep learning model, such as a recurrent neural network (RNN), a convolutional neural network (CNN), and a feed-forward neural network, or a Bayesian model. As such, in some embodiments, the processor 201 may include one or more processing cores configured to perform independently. A multi-core processor may enable multiprocessing within a single physical package.

Additionally or alternatively, the processor 201 may include one or more processors configured in tandem via the bus to enable independent execution of instructions, pipelining and/or multithreading. Additionally or alternatively, the processor 201 may include one or processors capable of processing large volumes of workloads and operations to provide support for big data analysis. However, in some cases, the processor 201 may be a processor specific device (for example, a mobile terminal or a fixed computing device) configured to employ an embodiment of the disclosure by further configuration of the processor 201 by instructions for performing the algorithms and/or operations described herein.

The memory 203 may comprise suitable logic, circuitry, and interfaces that may be configured to store a machine code and/or instructions executable by the processor 201. The memory 203 may be non-transitory and may include, for example, one or more volatile and/or non-volatile memories. For example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to store information including processor instructions for generate the map data associated with the one or more objects. Examples of implementation of the memory 203 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The communication interface 205 may comprise input interface and output interface for supporting communications to and from the user equipment 113, 115 or any other component with which the system 101 may communicate. The communication interface 205 may be any means such as a device or circuitry embodied in either hardware or a combination of hardware and software that is configured to receive and/or transmit data to/from a communications device in communication with the user equipment 113, 115. In this regard, the communication interface 205 may include, for example, an antenna (or multiple antennae) and supporting hardware and/or software for enabling communications with a wireless communication network. Additionally or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

The system 101 may be configured to generate an indoor emergency evacuation route plan by processing and executing upon indoor map data of an infrastructure and location data associated with an emergency event occurred inside the infrastructure. The indoor map data of the infrastructure comprises location data associated with the various objects of the infrastructure and one or more first exit routes to one or more exits of the infrastructure.

In accordance with an embodiment, the processor 201 may be configured to obtain one or more first exit routes from the indoor map data. The indoor map data is received from the indoor mapping platform 103 as shown in FIG. 1. Further, the processor 201 may be configured to obtain first location data associated with the emergency event within the infrastructure. The first location data may be geographical co-ordinates associated with the location of the emergency event. The processor 201 may obtain the first location data from the one or more sensors 119 within the infrastructure. Further, the processor 201 is configured to generate one or more second exit routes, based on the first location data and the one or more first exit routes. The one or more second exit routes bypass an emergency area, where the emergency event has occurred. The one or more second exit routes are then provided to each subject of the one or more subjects inside the infrastructure in a personalized manner, based on a location of the subject within the infrastructure with respect to the first location data and distance of the subject from the nearest exit.

In accordance with an embodiment, the processor 201 is configured to determine the emergency area associated with the emergency event inside the infrastructure, based on the first location data. The processor 201 is further configured to obtain second location data associated with the location of each subject of the one or more subjects, and a real-time sensor data comprising information related to failure of one or more electronic equipments of the infrastructure. Further, the processor 201 is configured to determine presence of the one or more subjects within the emergency area based on the second location data and the first location data. Upon determination, the processor 201, computes at least one closest exit route for at least one subject of the one or more subjects, based on the second location data of the at least one subject of the one or more subjects, the one or more second exit routes, and the real-time sensor data. The at least one closest exit route bypasses or avoids the emergency area. Further, in some example embodiments, the processor 201 is configured to provide navigation guide instructions corresponding to the one or more closest exit routes to the one or more subjects.

In accordance with another embodiment, the processor 201 may be configured to control congestion inside the infrastructure by rerouting the one or more subjects on the one or more second exit routes. The processor 201 is configured to determine congestion on any one exit route of the one or more second exit routes. On determination of the congestion on any of the exit routes, the processor 201 reroutes the one or more subjects in congestion to the at least one new closest exit route which have capacity to accommodate more subjects without leading to congestion. The processor 201 distributes the one or more subjects evenly among the one or more second exit routes, and thus controls congestion.

FIG. 3 illustrates an example representation 300 of indoor map data of an infrastructure, in accordance with an example embodiment of the present disclosure. In a non-limiting example, the infrastructure corresponding to an office workspace area 302 is illustrated in FIG. 3. As shown in the FIG. 3, the infrastructure 302 may contain workspace areas 351-370, one or more sensors 119 (for example, but not limiting to, CCTV cameras 311, 313, 315, 317, and 319), one or more objects for example, but not limiting to, tables, chairs, computers, doors, exit gateways, elevators, escalators or the likes. The indoor map data comprises one or more first exit routes 301, location of one or more exits 303, 305, 307, and 309, location of the workspace areas 351-370 within the infrastructure, location of the one or more CCTV cameras 311, 313, 315, 317, and 319, location of one or more objects inside the infrastructure, or the like. It shall be noted that the example representation of the indoor map data is not limiting the scope of the invention, and although the example representation illustrates few information related to the infrastructure such as exits, exit routes, sensors, objects but the indoor map data may comprise information related to more components possibly present in the infrastructure such as systems, windows, switch boards, or the like.

The indoor map data is used for guiding one or more subjects inside the infrastructure 302 towards one or more exits 305, 307, 309, and 311 of the infrastructure 302 during an emergency event. The emergency event may be any natural calamity like earthquakes, floods, lightening or the like. Further the emergency event may be an event of failure of equipment in the infrastructure causing risk to lives of the one or more subjects present within the infrastructure However, during the emergency event, one or more subjects present in the infrastructure 302 may be routed to the an exit route of the one or more first exit routes 301 which is affected by the emergency event. Therefore, routing one or more subjects based on the one or more first exit routes that are predefined for the infrastructure may pose threat to the lives of one or more subjects. Thus, there is a need for updating indoor emergency route plan in the emergency event in real-time in order to avoid any accident.

Accordingly, the present disclosure provides a method for generating an indoor emergency route plan updated in real-time as explained in detail in FIGS. 4A and 4B collectively. The real-time environmental condition may be obtained from one or more sensors 119 inside the infrastructure. The one or more sensors 119, as explained earlier with reference to FIG. 1, may identify an emergency event inside the infrastructure. The one or more sensors 119 may report to the system 101 the location of the emergency area where the emergency event has occurred. Further, one or more subjects in the infrastructure 300 may report to the system 101 the location of an emergency area. The inputs from one or more sensors 119 or inputs from the user equipment 113 associated with one or more subjects trigger the system 101 for dynamically generating an indoor emergency route plan considering real-time situation of the emergency event within the infrastructure.

On being triggered by the occurrence of the emergency event, the system 101 obtains indoor map data of the infrastructure from the indoor mapping platform 103, as explained earlier in FIG. 1. The indoor map data of the infrastructure may comprise one or more first exit routes of the infrastructure. Further, the system obtains location data associated with location of the indoor emergency event from the one or more sensors 119. The system 101 then generates the indoor emergency route plan based on the first location data and the one or more first exit routes. The indoor emergency route plan comprises one or more second exit routes that bypass the emergency area. The present disclosure provides a method for generating the indoor emergency route plan. The method is explained collectively in the FIGS. 4A and 4B.

FIGS. 4A and 4B collectively illustrate a flowchart for implementation of an exemplary method 400 for generating an indoor navigation route and evacuation plan, in accordance with an example embodiment. At step 403, the system 101 determines a presence of an emergency event inside an infrastructure based on real-time sensor data captured from the one or more sensors 119 present in the infrastructure. The infrastructure may be structures like multiplexes, hospital buildings, office buildings, campuses, malls, parking platforms, open air theatres, airports, railway stations, factories, industrial plants or any other enclosed structures. If the emergency event is determined to be absent the method 400 returns to step 401 however if the emergency event is determined to be present the method 400 proceeds to step 405.

At step 405, the system 101 extracts or obtains the indoor map data associated with the infrastructure either from the memory 203 where the indoor map data was pre-stored or the system 101 may extract or obtain the indoor map data from the indoor mapping platforms 103 on-demand. The indoor map data comprises two-dimensional or three-dimensional data representing objects and location of the objects inside the infrastructure. The indoor map data further comprises one or more first exit routes to one or more exits of the infrastructure. The system 101 extracts information related to one or more first exit routes from the indoor map data (for example the indoor map data shown in FIG. 3). With reference to FIG. 3, the indoor map data comprises the one or more first exit routes 301 to the one or more exits 303, 305, 307, and 309. The system 101 uses the indoor map data to determine respective positions of objects inside the workspace 302, for example position of tables, chairs, computers or the like within the infrastructure.

At step 407, the system 101, obtains first location data associated with location of an emergency event. The first location data may be obtained from one or more sensors 119. The first location data may be geographical co-ordinates associated with location of the emergency event. At step 409, the system 101 generates an emergency area polygon/polyhedron which comprises an emergency area/space of the infrastructure which is affected by the emergency event. The system 101 generates the emergency area polygon based on first location data associated with the emergency area and the indoor map data.

At step 411, the system 101 determines whether the emergency area polygon/polyhedron is present within or in vicinity of at least one exit route of the one or more first exit routes or not, based on analysis of the real-time sensor data and the indoor map data. The real-time sensor data may comprise real-time environmental data that indicates real-time positions of one or more subjects within the infrastructure, failure of one or more user equipment, blockage in stairway or the like. If it is determined that the emergency area polygon/polyhedron falls within at least one exit route of the one or more first exit routes the method 400 proceeds to step 415 otherwise the method 400 proceeds to step 413. At step, 413, the system 101 sends information corresponding to one or more first exit routes to one or more subjects in the infrastructure, and keeps monitoring the emergency area polygon in real-time based on real-time sensor data.

At step 415, the system 101 generates one or more second exit routes by blocking the at least one route of the one or more first exit routes in which the emergency area polygon/polyhedron is present. The one or more second exit routes are generated based on one or more first exit routes, the first location data, and the real-time sensor data. The system 101 uses routing algorithm to dynamically generate one or more second exit routes which helps in routing the one or more subjects to the closest and safe exit routes. The routing algorithm blocks the at least one route in which the emergency area is identified to generate the one or more second exit routes. Therefore, the generated one or more second exit routes bypass or avoid the emergency area in real-time.

At step 419, the system 101 obtains second location data associated with location of one or more subjects. The second location data may comprise geographical co-ordinates associated with the location of the one or more subjects. The system 101 may obtain the second location data from the real-time sensor data captured from the one or more sensors 119. The one or more sensors 119 may be associated with user equipment 113, 115 of the one or more subjects.

The real-time sensor data may be dynamic content information that indicates, for example failure or shutting down of lifts, disabled escalators, temporary entrance or exit gateway closure, Radio-Frequency (RF) beacon point disable function etc. The real-time sensor data is important in order to determine at least one closest passable exit route for the one or more subjects.

Further, at step 421, the system 101 determines whether the one or more subjects are present in the emergency area polygon. If it is determined that the one or more subjects are present in the emergency area polygon, the method 400 proceeds to step 425 otherwise the method 400 proceeds to step 423. At step 423, the system 101, sends navigation guide instructions corresponding to the one or more second exit routes to the one or more subjects inside the infrastructure based on the respective second location data of the one or more subjects. The system 101 updates the indoor map data of the infrastructure, based on the first location data and the one or more second exit routes, and where the updated indoor map data further comprises the real-time sensor data.

However, if it is determined that the one or more subjects are present in the emergency area polygon, then at step 425, the system 101 computes at least one closest exit route of the one or more second exit routes routing to the one or more closest exits of the infrastructure. The at least one closest exit route is determined based on the location of the one or more subjects, and the real-time sensor data. The at least one closest exit route bypasses the emergency area. Further, the system 101 provides navigation guide instructions to the one or more subjects based on the closest exit route and the second location data of the one or more subjects. The one or more subjects may be humans or automated guided vehicles. The navigation guide instructions for the one or more humans of the one or more subjects may be push notifications on user devices, audio data and/or video data guiding the users to the one or closest exit routes. On the other hand, the navigation guide instructions for the robots or automated guided vehicles of the one or more subjects may be provided using Vehicular Ad-hoc networks (VANET) or OEM cloud services that guides the automated guided vehicles or robots to the one or more closest exit routes. A practical implementation of the above discussed method is explained in FIG. 5 with reference to FIG. 3.

FIG. 5 illustrates an exemplary environment 500 depicting a practical implementation of the present invention rendering solution to a problem illustrated in FIG. 3, in accordance with an example embodiment of the present disclosure. It shall be noted that the reference numeral for the components present in the FIG. 5 as well as FIG. 3 are kept same for the sake of brevity. As illustrated in FIG. 5, an emergency event has occurred inside the workspace area 302, where the emergency event is caused because of fire in a meeting room 370. The workspace area 302 may be equipped with one or more sensors 119, for example surveillance cameras 311, 313, 315, 317, and 319, one or more smoke detectors or the likes. The CCTV cameras 315, 317 or one or more smoke detectors in the meeting room 370 may determine occurrence of fire in the meeting room 370. The CCTV cameras 315, 317, and the one or more smoke detectors may send the real-time sensor data to the system 101 to report the occurrence of the emergency event. The real-time sensor data invokes the system 101 to generate one or more second exit routes 501. In an alternate or additional embodiment, the one or more subjects inside the infrastructure may directly report the location of the emergency event in order to invoke the system 101.

On being invoked the system 101 obtains indoor map data of the workspace area 302. The indoor map data comprises one or more first exit routes 301 of the workspace area 302. Further, the system 101 obtains first location data associated with the location of the emergency event from the one or more sensors 119. The system 101 further generates an emergency area polygon 511 based on the location data associated with the emergency event (for example location of the meeting room 370) as reported by the one or more sensors 119. For example, as illustrated in the FIG. 5, the emergency area polygon 511 generated by the system 101 surrounds the portion of the meeting room area 370 that is affected by the fire. The system 101, keeps updating the emergency area polygon 511 based on real-time data obtained from the one or more sensors 119. Further, the system 101 determines whether the emergency area polygon 511 is present within at least one or more first exit routes 301. As illustrated in the FIG. 5, emergency area polygon 511 is present within an exit route 307 of the one or more first exit routes. Therefore, the system 101 generates the one or more second exit routes 501 that bypass the emergency area 370.

The system 101 then obtains second location data associated with location of the one or more subjects in the infrastructure. The second location data may be geographical co-ordinates associated with the location of the one or more subjects in the infrastructure. The system 101 may obtain the second location data from the one or more sensors 119 as explained in FIG. 1. Further, the system determines whether at least one subject of the one or more subjects is present in proximity of the emergency area polygon 511 or not.

On determining the presence of the at least one subject of the one or more subjects in proximity of the emergency area polygon 511, the system 101 computes at least one closest exit route from the one or more second exit routes. For example, the system 101 may compute the closest exit route to the exits 303, 309, from the one or more second exit routes 501, for the one or more subjects in the workspaces 364, 362. Further, the system 101 provides navigation guide instructions corresponding to the one or more second exit routes 501 to the one or more subjects. The navigation guide instructions guides the one or more subjects to the closet exit routes.

Upon receiving the navigation guide instructions, the one or more subjects are routed to the closest exit route. This helps in immediate evacuation of the one or subjects inside the infrastructure. However, the conditions inside the infrastructure during the emergency event may be unpredictable. There is a possibility that the one or more subjects may get stuck into congestion at one exit route of the one or more second exit routes. This congestion may occur when the one or more subjects are not routed uniformly or when the routing is not updated dynamically based on real-time data of the traffic or when the one or more subjects are only informed about the closest exit route instead of the fastest exit route without knowledge of the traffic in that exit route. The congestion prone evacuation situation is explained further in FIG. 6

FIG. 6 illustrates an exemplary environment 600 depicting congestion at one or more exit routes during an evacuation process, in accordance with an example embodiment of the present disclosure. The environment 600 illustrates emergency event that may occur at one of the exit gateway 603 of a parking area 602. The emergency area polygon 611 shows the affected area due to the emergency event. As shown in the FIG. 6, congestion may occur at one exit route of a parking area 602 due to an emergency event such as fire. It shall be noted that the environment 600 is shown comprising a parking area 602 however it shall not limit the scope of the invention, and the environment 600 may comprise any enclosed infrastructure such as workspace, hospital, shop or the like. The congestion may have arisen due to accumulation of the one or more subjects on the at least one exit route more than a maximum traffic outflux capacity of the at least one exit route, where the subjects may be humans or non-humans. As shown in FIG. 6, congestion of traffic occurs at the time of the emergency event inside the parking area 602. During the emergency event, the system 101 may have routed a plurality of vehicles 613 through exit route 617 towards exit gateway 601 and a plurality of vehicles 615 are routed through exit route 619 towards exit gateways 605. Further, as shown in the FIG. 6 the plurality of vehicles 613 accumulated in the exit route 617 are more than the plurality of vehicles 615 accumulated in the exit route 619 resulting in congestion at the exit route 617. The problem of congestion at the exit route 617 arises because of lack of real-time knowledge of the situation. It shall be noted that for purpose of illustration only one vehicle on the exit route 617 is labelled as 613 but it shall be apparent to a person skilled in the art that the numeral 613 may also indicate any vehicle present on the route 617. Similarly numeral 615 may indicate any vehicle present on the exit route 619.

The problem of congestion may also occur when the one or more subjects present in the parking area 602 start moving towards exit routes in a haphazard manner due to panic, which may lead to accumulation of a number of one or more subjects at one exit route which is greater than an outflux capacity of the one exit route. The present invention provides a method to avoid congestion, which is explained below in detail in conjunction with FIGS. 4A, 4B and 7.

FIG. 7 illustrates a flowchart for implementation of an exemplary method 700 for controlling congestion that may occur during emergency evacuation, in accordance with an example embodiment. The method 700 may begin in succession with the step 425 described with reference to FIG. 4B. After sending the updated routes (i.e. the one or more second exit routes) to the one or more subjects, at step 425, in FIG. 4B, the system 101, at step 727, may further determine whether there is congestion on the at least one exit route of the one or more second exit routes inside the infrastructure. In order to determine congestion at one of the exit routes of the one or more second exit routes, the system 101 obtains maximum traffic outflux capacity of each exit route of the one or more first exit routes from the indoor map data. The maximum traffic outflux capacity of an exit route indicates either a threshold number of subjects that may pass through the exit route per unit time.

The system 101 further obtains a real-time count of number of subjects present in each exit route of the one or more second exit routes. The system 101 determines a maximum traffic outflux capacity of each exit route of the one or more second exit routes, based on the maximum traffic outflux capacity of each exit route of the one or more first exit routes. Further, the system 101 determines whether the real-time count of subjects present in a third exit route of the one or more second exit routes exceeds the maximum traffic outflux capacity of the third exit route of the one or more second exit routes.

When the real-time count of the number of subjects present in the third exit route exceeds the maximum traffic outflux capacity of the third exit route, it is determined that the third exit route is under congestion. Upon determining that at least one exit route (i.e. the third exit route) of the one or more second exit routes has congestion, the method 700 proceeds to step 729.

At step 729, the system 101, recomputes at least one new closest exit route. To recompute the at least one new closest exit route, the system 101 identifies a fourth exit route of the one or more second exit routes whose maximum outflux capacity is greater than a real-time count of a number of the one or more subjects present in the fourth exit route. Based on the identification of the fourth exit route, the system 101 further determines a difference between the maximum outflux capacity of the fourth exit route and the number of the one or more subjects present in the fourth exit route. At step 731, the system 101 reroutes a first number of subjects of the one or more subjects present in the third exit route to the fourth exit route using the navigation guide instructions. The first number of subjects rerouted to the fourth exit route are determined based on the difference between the maximum outflux capacity of the fourth exit route and the number of the one or more subjects present in the fourth exit route. The navigation guide instructions are dynamically updated based on the changes in the routes to be followed by the one or more subjects to exit the infrastructure. This approach of the method 700 uniformly distributes the traffic between the one or more second exit routes in the infrastructure which in turn reduces congestion. Further, the system 101 may recompute the at least one new closest exit route based on one of a shortest time, a shortest route or minimization of cost functions with respect to the exit route facing congestion and further taking into account the real-time sensor data in emergency events.

In an alternate embodiment, the system 101, after obtaining the second location data associated with the one or more subjects inside the infrastructure at step 419, in FIG. 4B, may obtain maximum traffic outflux capacity of the one or more second exit routes. Then system 101 determines closest exit routes for the one or more subjects based on the maximum traffic outflux capacity of the one or more second exit routes and the second location data of the one or more subjects to counter the congestion situation in advance. Thus, the subjects are distributed uniformly between the second exit routes. This avoids the possibility of congestion in the infrastructure during an emergency event. A practical implementation of the above discussed method is explained below with reference to FIG. 6 and FIG. 8.

FIG. 8 illustrates an exemplary environment 800 depicting another practical implementation of the proposed method in FIG. 7 to control congestion, in accordance with an example embodiment of the present disclosure. It shall be noted that the reference numeral for the components present in the FIG. 8 as well as FIG. 6 are kept same for the sake of brevity. The environment 800 illustrates the parking area 602 as shown in FIG. 6 as well. The practical implementation illustrated in the FIG. 8 solves the problem of congestion on at least one exit route during an evacuation process at the parking area 602. After the one or more subjects (for example vehicles 613, 615) are routed to one or more second exit routes (617, 619), the system 101 obtains real-time count of the vehicles 613 on the exit route 617 and real-time count of the vehicles 615 on the exit route 619. The system 101 may obtain the real-time count of the vehicles 613, 615 from the one or more sensors 119 in the infrastructure for example, surveillance cameras 621, 623, 627, and 629 as shown in the FIGS. 6 and 8.

Further, the system 101 obtains maximum traffic outflux capacity of the one or more second exit routes from the indoor map data. For example, the maximum traffic outflux capacity of the route 617 may be for example 11 vehicles and that of the route 619 may be for example 10 vehicles. The system 101 then determines whether the real-time count of the vehicles on the one or more second exit routes exceed a maximum traffic outflux capacity of the respective one or more second exit route. For example, the system 101 determines the real-time count of 14 vehicles 613 on the route 617 and 7 vehicles 615 on the exit route 619.

Based on the real-time count of the traffic and the maximum traffic outflux capacity, the system 101 determines that route 617 is under congestion. Upon determining that the exit route 617 is under congestion, the system 101 recomputes one or more second exit routes for the vehicles 613 under congestion on route 617. To recompute, the system 101 identifies that the exit route 619 has maximum traffic capacity (i.e. 11) greater than the real-time count of vehicles 615 (i.e. 7) present on the route 619.

The system further determines a difference between the maximum outflux capacity of the exit route 619 (i.e. 11) and the number of the vehicles 613 present on the exit route 619 (i.e. 14). The system 101 reroutes a first number of vehicles from the vehicles 613 present on the exit route 617 to the exit route 619 using navigation guide instructions. The first number of vehicles rerouted to the exit route 619 are determined based on the difference between the maximum outflux capacity of the exit route 619 (i.e. 11) and the number of vehicles 615 present in the exit route 619 (i.e. 7). For example, the system may route four vehicles from the vehicles 613 on the route 617 to the route 619. Thus, traffic inside the infrastructure is uniformly distributed between the second exit routes based on their respective maximum traffic outflux capacity.

In another embodiment, the system 101 may determine area of one or more vehicles on one or more second exit routes of an infrastructure along with a real-time count of the one or more vehicles on each of the one or more second exit routes. Based on the area occupied by each of the one or more vehicles on the one or more second exit routes, the total area of the at least one exit route of the one or more second exit routes, and real-time count of the one or more vehicles on the at least one exit route of the one or more second exit routes, the system 101 determines congestion on the at least one exit route of the one or more second exit routes. Further, the system 101 recomputes one or more new exit routes for the one or more vehicles on the one or more second exit routes. The system 101 provides navigation guide instructions corresponding to the recomputed one or more exit routes to the one or more vehicles to control the congestion.

The advantages of the proposed invention are that system 101 dynamically generates one or more new exit routes that bypass an emergency area based on real-time information obtained from one or more sensors or one or more subjects, thereby generating safer evacuation routes. The system 101 determines a closest exit route, for one or more subjects, from the new one or more exit routes. The system 101 provides the one or more subjects navigation guide instructions corresponding to the one or more new exit routes to the one or more subjects. The one or more subjects comprise at least one of a human or a non-human. For example, the system 101 may provide navigation guide instructions in form of audio data or video data that may be comprehended by the humans. Further, the system 101 may provide the navigation guide instructions to non-humans, for example automated guided vehicles, through Vehicular Ad-hoc Network (VANET).

Further, in the proposed invention, the system takes into account real-time sensor data comprising, for example a real-time count of the one or more subjects on the one or more second exit routes, in order to avoid congestion of the subjects on a respective one of the one or more second exit routes. This ensures timely evacuation of the one or more subjects to one or more safe area or the one or more exits. This optimizes indoor navigation plan.

FIG. 9 exemplarily illustrates a flowchart for implementation of an exemplary method 900 for generating indoor emergency route plan for evacuation from an infrastructure, in accordance with an example embodiment. It will be understood that each block of the flowchart of the method 900 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present disclosure and executed by the processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flowchart support combinations of means for performing the specified functions and combinations of operations for performing the specified functions for performing the specified functions. It will also be understood that one or more blocks of the flowchart 900, and combinations of blocks in the flowchart 900, may be implemented by special purpose hardware-based computer systems which perform the specified functions, or combinations of special purpose hardware and computer instructions.

The method 900 illustrated by the flowchart of FIG. 9 for generating indoor emergency route plan for an infrastructure includes, at 901, obtaining indoor map data of the infrastructure. The indoor map data comprises one or more first exit routes. The indoor map data may also comprise location of one or more objects inside the infrastructure. The objects may be doors, escalators, lift, one or more sensors 119. The method 900 includes, at step 903, obtaining first location data associated with an emergency event that has occurred inside the infrastructure.

Once the indoor map data and the first location data associated with the location of the emergency event is received, the method 900 may further include, at 905, generating one or more second exit routes to one or more exits, based on the first location data and the one or more first exit routes. The one or more second exit routes bypass an emergency area inside the infrastructure where the emergency event has occurred. Further, the method 900 includes, at 907, providing the one or more second exit routes to the one or more subjects.

In accordance with an example embodiment, the method 900 may further include several steps not shown in FIG. 9. For example, the method 900 may include determining an emergency area polygon based on the location data associated with the emergency event, determining location data associated with location of one or more subjects inside the infrastructure, and further determining presence of the one or more subjects within the emergency area polygon, based on the location data associated with the location of the one or more subjects and the location data associated with the location of the emergency event.

In accordance with an embodiment, the method 900 may include determining congestion on the one or more second exit routes, and controlling the congestion by routing the one or more subjects to one or more new closest exit routes, which one or more new closest exit routes are not under congestion.

In an example embodiment, a system 101 for performing the method 900 of FIG. 9 above may comprise a processor (e.g. the processor 201) configured to perform some or each of the operations (901 to 907) described above. The processor 201 may, for example, be configured to perform the operations (901-907) by performing hardware implemented logical functions, executing stored instructions, or executing algorithms for performing each of the operations. Alternatively, the system 101 may comprise means for performing each of the operations described above. In this regard, according to an example embodiment, examples of means for performing operations 901-907 may comprise, for example, the processor 201 and/or a device or circuit for executing instructions or executing an algorithm for processing information as described above.

On implementing the method disclosed herein, the end result generated by the system 101 is a tangible generation of an indoor emergency route plan. Example embodiments disclosed herein provide an improvement in indoor navigation technology in terms of updating the indoor emergency route plan of an infrastructure in real-time based on real-time environmental conditions of the infrastructure. The methods and systems disclosed herein use the real-time sensor data to generate new exit routes that bypass the emergency area. Further, the methods and systems use the real-time sensor data to control congestion inside the infrastructure during the emergency event.

The system 101 keeps updating the generated indoor emergency route plan, based on real-time environmental conditions inside the infrastructure. These real-time environmental conditions are provided by the one or more sensors 119. Thus, the indoor emergency route plan provides accurate routing information, which ensures speedy and safe evacuation of the one or more subjects.

Generally, the methods and systems disclosed herein may be used to provide indoor emergency route plan for evacuation from an infrastructure. The invention disclosed herein eliminates error caused in routing the one or more subjects due to lack of real-time environmental information inside the infrastructure during an emergency event. The method and the system 101 disclosed herein may be used for routing the one or more subjects safely to one or more exits, for example by routing the one or more subjects on one or more exit routes that bypass an emergency area. Further, the method and the system 101 may be used to control congestion which ensures timely and speedy evacuation of the one or more subjects.

Many modifications and other embodiments of the inventions set forth herein will come to mind to one skilled in the art to which these inventions pertain having the benefit of the teachings presented in the foregoing descriptions and the associated drawings. It is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for generating an emergency route plan for an infrastructure, the system comprising:
   at least one processor; and
   at least one memory including computer program code for one or more programs,
   the at least one memory and the computer program code configured to, with the at least one processor, cause the system to:
   obtain indoor map data of the infrastructure, wherein the indoor map data comprises one or more first exit routes to one or more exits in the infrastructure;
   obtain first location data associated with an indoor emergency event;
   generate one or more second exit routes to the one or more exits, based on the first location data and the one or more first exit routes; and
   provide the one or more second exit routes to one or more subjects, wherein the one or more subjects comprise at least one automated guided vehicle located inside the infrastructure, and wherein the one or more processors are further configured to transmit vehicle navigation instructions to the at least one automated guided vehicle to exit the infrastructure based on the one or more second exit routes.

2. The system of claim 1, wherein the one or more processors are further configured to:
   determine an emergency area associated with the indoor emergency event, based on the first location data;
   obtain second location data of each subject of the one or more subjects and real-time sensor data of the infrastructure, wherein the real-time sensor data indicates at least one of a first location data of the emergency area or a failure of one or more equipment inside the infrastructure;
   determine a presence of the one or more subjects in the emergency area, based on the second location data of each subject of the one or more subjects and the first location data; and
   compute at least one closest exit route for at least one subject of the one or more subjects, based on the second location data of the at least one subject of the one or more subjects, the one or more second exit routes, and the real-time sensor data, wherein the at least one closest exit route bypasses the emergency area.

3. The system of claim 2, wherein the indoor map data further comprises a maximum traffic outflux capacity of each of the one or more first exit routes, and wherein the one or more processors are further configured to:
   obtain a real-time count of subjects on each of the one or more second exit routes; and
   recompute the at least one closest exit route, based on the maximum traffic outflux capacity of each of the one or more first exit routes and the real-time count of subjects on each of the one or more second exit routes.

4. The system of claim 3, wherein to recompute the at least one closest exit route, the one or more processors are further configured to:
   determine a maximum traffic outflux capacity of each of the one or more second exit routes, based on the maximum traffic outflux capacity of each of the one or more first exit routes; and
   determine whether the real-time count of subjects on at least one exit route of the one or more second exit routes exceeds the maximum traffic outflux capacity of a respective exit route of the one or more second exit routes.

5. The system of claim 3, wherein the one or more processors are further configured to recompute the at least one closest exit route based on one of a shortest time, a shortest route or minimization of cost functions that take into account the real-time sensor data in emergency events.

6. The system of claim 2, wherein the one or more processors are further configured to update the indoor map data of the infrastructure, based on the first location data and the one or more first exit routes, and wherein the updated indoor map data further comprises the real-time sensor data.

7. The system of claim 1, wherein the one or more subjects comprise mapping service providers, and wherein the mapping service providers provide map data for navigation assistance.

8. The system of claim 1, wherein the one or more processors are further configured to provide the one or more second exit routes via at least one of audio data or video data corresponding to the one or more second exit routes.

9. The system of claim 1, wherein the one or more processors are further configured to provide the one or more second exit routes to one or more automated guided vehicles using Vehicular Ad-hoc Network (VANET).

10. A system of claim 1, wherein the one or more second exit routes are distributed among the one or more subjects based on congestion on any one of the one or more second exit routes.

11. A method for generating an indoor emergency route plan for an infrastructure, the method comprising:
    obtaining indoor map data of the infrastructure, wherein the indoor map data comprises one or more first exit routes to one or more exits in the infrastructure;
    obtaining first location data associated with an indoor emergency event;
    generating one or more second exit routes to the one or more exits, based on the first location data and the one or more first exit routes; and
    providing the one or more second exit routes to one or more subjects, wherein the one or more subjects comprise at least one automated guided vehicle located inside the infrastructure, and wherein the one or more processors are further configured to transmit vehicle navigation instructions to the at least one automated guided vehicle to exit the infrastructure based on the one or more second exit routes.

12. The method of claim 11, wherein the method further comprises:
    determining an emergency area associated with the indoor emergency event, based on the first location data;
    obtaining second location data of each subject of the one or more subjects and real-time sensor data of the infrastructure, wherein the real-time sensor data indicates at least one of a first location data of the emergency area or a failure of one or more equipment inside the infrastructure;
    determining a presence of the one or more subjects in the emergency area, based on the second location data of each subject of the one or more subjects and the first location data; and
    computing at least one closest exit route for at least one subject of the one or more subjects, based on the second location data of the at least one subject of the one or more subjects, the one or more second exit routes, and the real-time sensor data,
    wherein the at least one closest exit route bypasses the emergency area.

13. The method of claim 12, wherein the indoor map data further comprises a maximum traffic outflux capacity of each exit route of the one or more first exit routes, and wherein the method further comprises:
  obtaining a real-time count of subjects on each exit route of the one or more second exit routes; and
  recomputing the at least one closest exit route, based on the maximum traffic outflux capacity of each exit route of the one or more first exit routes and the real-time count of subjects on each exit route of the one or more second exit routes.

14. The method of claim 13, wherein recomputing the at least one closest exit route comprises:
  determining a maximum traffic outflux capacity of each exit route of the one or more second exit routes, based on the maximum traffic outflux capacity of each of the one or more first exit routes; and
  determining whether the real-time count of subjects on at least one exit route of the one or more second exit routes exceeds the maximum traffic outflux capacity of a respective exit route of the one or more second exit routes.

15. The method of claim 11, wherein the one or more subjects comprise at least one of automated guided vehicles or users, and wherein providing the one or more second exit routes to one or more subjects comprises transmitting navigation instructions to the one or more subjects.

16. The method of claim 15, wherein the one or more second exit routes are provided to the one or more automated guided vehicles comprises using Vehicular Ad-hoc Network (VANET).

17. The method of claim 11, wherein the one or more subjects comprises mapping service providers, and wherein the mapping service providers provide map data for navigation assistance.

18. The method of claim 11, wherein providing the one or more second exit routes comprises providing the one or more second exit routes via at least one of audio data or video data corresponding to the one or more second exit routes.

19. A non-transitory computer readable medium having stored thereon, computer-executable instructions for causing a computer to execute operations for generating an indoor emergency route plan for an infrastructure, the operations comprising:
  obtaining indoor map data of the infrastructure, wherein the indoor map data comprises one or more first exit routes to one or more exits in the infrastructure;
  obtaining first location data associated with an emergency event;
  generating one or more second exit routes to the one or more exits, based on the first location data and the one or more first exit routes; and
  providing the one or more second exit routes to one or more subjects, wherein the one or more subjects comprise at least one automated guided vehicle located inside the infrastructure, and wherein the one or more processors are further configured to transmit vehicle navigation instructions to the at least one automated guided vehicle to exit the infrastructure based on the one or more second exit routes.

* * * * *